United States Patent [19]

Laurie

[11] 4,253,926

[45] Mar. 3, 1981

[54] UTILIZATION OF HIGH SULPHUR FUELS WITHOUT AIR POLLUTION

[76] Inventor: John S. Laurie, Box 27, Mountainville, N.Y. 10953

[21] Appl. No.: 75,247

[22] Filed: Sep. 13, 1979

[51] Int. Cl.³ .......................... B01J 19/08; B01J 19/12
[52] U.S. Cl. ................................ 204/157.1 R; 250/527
[58] Field of Search .................. 204/157.1 R; 250/527

[56] References Cited
U.S. PATENT DOCUMENTS 3,565,777  2/1971  Lauer ............................ 204/157.1 R Primary Examiner—Howard S. Williams
Attorney, Agent, or Firm—Steinberg & Raskin

[57] ABSTRACT

When sulphur fuels are burned, for example in a furnace, the combustion gases including sulphur dioxide are passed across floodlights which break the sulphur dioxide bonds to release sulphur and oxygen. In the burning of sulphur fuels in a boiler sulphur dioxide is liberated into the smokestack. By placing a floodlight in the base of the smokestack the $SO_2$ gas is broken up by the action of light into S and O. Means may be provided for recovery and/or re-burning of the sulphur.

5 Claims, 1 Drawing Figure

U.S. Patent  Mar. 3, 1981  4,253,926
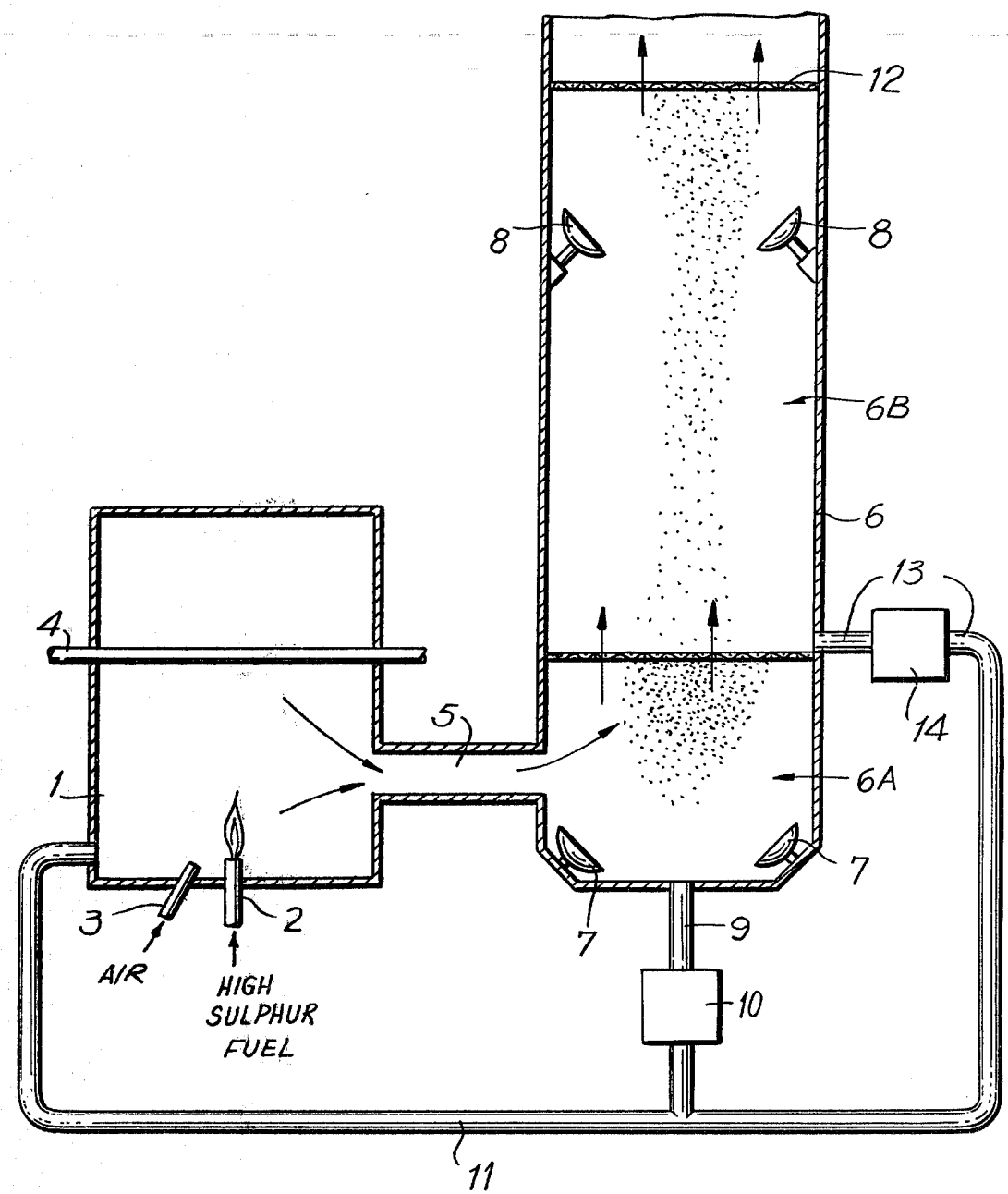

UTILIZATION OF HIGH SULPHUR FUELS WITHOUT AIR POLLUTION

BACKGROUND OF THE INVENTION

The use of high sulphur fuels has for many years been avoided because of the pollution resulting from the use thereof, this pollution being due to the formation of sulphur dioxide when the fuel is burned. However, in recent times, particularly as a result of the energy shortage, it has become necessary to utilize high sulphur fuels despite the pollution caused by such use.

Attempts to avoid or even decrease sulphur dioxide pollution resulting from the use of high sulphur fuels have been unsatisfactory mainly due to the expensive installations required for this purpose, i.e., wet scrubbers, etc.

SUMMARY OF THE INVENTION

Generally speaking, in accordance with the present invention, the gases of combustion of a high sulphur fuel, which gases contain sulphur dioxide, are passed across floodlights before the gases can enter the atmosphere, the light causing the bonds of the sulphur dioxide to break into sulphur and oxygen.

It is accordingly a primary object of the present invention to provide a method for the utilization of high sulphur fuels without air pollution.

It is another object of the present invention to provide a method of utilizing high sulphur fuels while avoiding air pollution.

It is yet a further object of the present invention to provide an apparatus for the utilization of high sulphur fuels without causing air pollution.

The present invention further includes as an object thereof the provision of an apparatus for burning high sulphur fuels without causing air pollution.

Other objects and advantages of the present invention will be apparent from a further reading of the specification and of the appended claims.

With the above and other objects in view, the present invention mainly comprises the burning of a high sulphur fuel which produce energy and gases of combustion including sulphur dioxide, and passing the gases of combustion across floodlights prior to entering the atmosphere, whereby the sulphur dioxide is broken down to sulphur and oxygen, thus preventing sulphur dioxide from entering into and polluting the atmosphere.

BRIEF DESCRIPTION OF THE DRAWINGS

For a fuller understanding of the invention, reference is had to the following description taken in connection with the accompanying drawings in which the FIGURE diagrammatically illustrates an apparatus for carrying out the process of the invention.

DESCRIPTION OF PREFERRED EMBODIMENTS

Referring to the FIGURE, a high sulphur fuel is burned in a furnace 1. If the high sulphur fuel is a liquid such as oil, it is passed into the furnace 1 for burning through a conduit 2. Air for the burning is supplied through conduit 3. In the case of the use of coal as the high sulphur fuel, a somewhat different furnace arrangement is provided (not shown) wherein coal is introduced above the flame portion and the air may be introduced at another portion of the furnace. The energy in the form of heat resulting from the burning of the fuel is collected by means of a heat exchanger 4. The gases of combustion, which include sulphur dioxide leave the furnace 1 through conduit 5 where they enter into smokestack 6. Smokestack 6 is provided at the base thereof with floodlights 7. The floodlights acting on the sulphur dioxide cause the breaking of the bonds thereof to form sulphur and oxygen. The sulphur is formed as particles with the oxygen of course being in gaseous form.

In accordance with a preferred embodiment of the invention the particles of sulphur are prevented from passing upwardly into the atmosphere by means of the filter 12 while the gaseous oxygen passes through the filter. Thus, the sulphur particles remain in the bottom zone 6A of the smokestack. These sulphur particles in zone 6A are withdrawn from the smokestack through conduit 9 by means of pump 10 and pumped through conduit 11 back into the furnace 1. The sulphur is there burned to provide additional heat energy and since sulphur combines with oxygen at a temperature of 500° F, considerable heat energy is provided.

Any sulphur dioxide in smokestack 6 which passes from zone 6A to zone 6B, either as a result of incomplete decomposition of the sulphur dioxide from the floodlights 7, or because of possible malfunction of the floodlights 7 pass upwardly across floodlight 8 in zone 6B which decomposes the sulphur dioxide to oxygen and particulate sulphur. The particulate sulphur is prevented from entering the atmosphere by filter 12. The particulate sulphur in zone 6B is withdrawn from the smokestack through conduit 13 by means of pump 14 which pumps the sulphur into conduit 11 and from there back into the furnace 1.

The use of the floodlight at the base of the smokestack results in the breaking of the bonds of the sulphur dioxide so as to permit the use of high sulphur fuel which is both more available and cheaper while preventing pollution of the atmosphere.

The percentage of sulphur dioxide entering the smokestack depends on the sulphur content of the utilized fuel. Some high sulphur fuels contain 1% sulphur and some as high as 2% and more. The percentage of sulphur dioxide is immaterial because of the highly effective nature of the floodlight in breaking the sulphur dioxide bonds.

In general, the percentage of sulphur dioxide entering at the bottom of the stack is about 0.5% by weight while the amount of sulphur dioxide leaving the stack is substantially zero. It is possible to permit the atomic sulphur resulting from the decomposition of the sulphur dioxide to leave the stack.

The time of duration of the smoke in the stack depends of course on the height of the stack and is generally about 1½ minutes.

While the invention has been described in particular with respect to a specific apparatus and method, it is apparent that variations and modifications of the invention can be made.

What is claimed is:

1. Method for avoiding air pollution when burning high sulphur fuels, which comprises burning a high sulphur fuel to produce heat energy and gases of combustion including sulphur dioxide, and passing the gases of combustion into the base of a smokestack and across a floodlight located in the base and then across a further floodlight located in an upper portion of the smokestack prior to such gases entering the atmosphere, whereby the sulphur dioxide is decomposed by the floodlight into sulphur and oxygen so that sulphur dioxide does not enter the atmosphere.

2. Method according to claim 1 wherein sulphur resulting from the decomposition of the sulphur dioxide is returned for burning to provide additional energy.

3. Apparatus for decomposition sulphur dioxide which is formed as the product of combustion in a boiler or the like into its elemental component, namely gaseous oxygen and sulphur in solid form, to prevent the sulphur dioxide from entering the atmosphere, comprising a chimney including an enclosed passage communicating with the atmosphere for conducting gases directed into said passage to the atmosphere; conduit means in fluid communication with said enclosed passage for directing the sulphur dioxide into said enclosed passage; and two light means located within said enclosed passage respectively in a base portion and upper portion thereof for projecting relatively broad beams of light onto said sulphur dioxide in a manner such that the latter decomposes into oxygen and sulphur in particulate form prior to entering the atmosphere, whereby sulphur dioxide is prevented from entering the atmosphere.

4. Apparatus according to claim 3 wherein said light means comprise floodlights.

5. Apparatus according to claim 3 wherein a filter means is located within said enclosed passage extending transversely across said passage for preventing passage of the particulate sulphur through the filter means.

* * * * *